(12) United States Patent
Martick

(10) Patent No.: US 11,914,503 B2
(45) Date of Patent: Feb. 27, 2024

(54) AUTOMATED PERFORMANCE MEASUREMENT OVER SOFTWARE LIFECYCLE

(71) Applicant: SAP SE, Walldorf (DE)

(72) Inventor: Christian Martick, Wendisch Rietz (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/464,512

(22) Filed: Sep. 1, 2021

(65) Prior Publication Data

US 2023/0068602 A1     Mar. 2, 2023

(51) Int. Cl.
*G06F 11/36* (2006.01)
*G06N 20/00* (2019.01)

(52) U.S. Cl.
CPC ...... *G06F 11/3684* (2013.01); *G06F 11/3664* (2013.01); *G06F 11/3688* (2013.01); *G06N 20/00* (2019.01)

(58) Field of Classification Search
CPC . G06F 11/36–3696; G06F 11/34–3495; G06N 20/00
See application file for complete search history.

(56) References Cited

U.S. PATENT DOCUMENTS

| | | | | |
|---|---|---|---|---|
| 9,411,712 B2* | 8/2016 | Feynman | ............ | G06F 11/3684 |
| 9,563,541 B2* | 2/2017 | Spengler | ............ | G06F 11/3476 |
| 11,190,562 B2* | 11/2021 | Feinstein | ............... | G06N 3/084 |
| 2010/0318481 A1* | 12/2010 | Feynman | ............ | G06F 11/3684 717/124 |
| 2012/0131554 A1* | 5/2012 | Mueller | ............. | G06F 11/3664 717/124 |
| 2016/0314061 A1* | 10/2016 | Spengler | ............ | G06F 11/3668 |
| 2020/0304550 A1* | 9/2020 | Feinstein | ............... | G06N 3/088 |
| 2021/0312277 A1* | 10/2021 | Prabhudesai | .......... | G06N 3/084 |

\* cited by examiner

*Primary Examiner* — Todd Aguilera
(74) *Attorney, Agent, or Firm* — Fountainhead Law Group P.C.

(57) ABSTRACT

Embodiments facilitate testing of software functions, by elaborating upon a small volume test sample originally provided by a developer. Where the original test sample is determined to be numerical, embodiments perform repetition techniques to generate corpuses of test data of varying scope representing operation over different timescales. For original test samples of greater complexity (e.g., including text and/or hierarchical output states of the software function), embodiments select a relevant Machine Learning (ML) model and apply that ML model to generate the corpuses of test data. These are then available for loading to measure one or more performance parameters (e.g., runtime, memory consumption; processing consumption; bandwidth) of the software function. Broadly reported non-linear behavior of performance parameter(s) may reveal lack of suitability of the generated data corpuses for testing. More specific non-linear behavior may indicate failure of the software function to pass certain tests.

18 Claims, 9 Drawing Sheets

FIG. 5

```swift
class underTest: NSObject, SAPPerformanceSampleData { func getSampleInputDataFor(methodName: String) -> Any? {
        if methodName == "simpleCalculationNonLinearWithDataIn:" {
            return [10,20,30,40]
        } else if methodName == "simpleCalculationLinearWithDataIn:" {
            return [40,10,340,40]
        } else if methodName == "complexActionNonLinearWithDataIn:" {
            return [1,90,45,40]
        } else if methodName == "complexActionLinearWithDataIn:" {
            return [1,4,30,4]
        }
        return nil
    }
    // additional code
}
```

AUTOMATED PERFORMANCE MEASUREMENT OVER SOFTWARE LIFECYCLE

BACKGROUND

Unless otherwise indicated herein, the approaches described in this section are not prior art to the claims in this application and are not admitted to be prior art by inclusion in this section.

Performance characteristics of software offer valuable insight into deployment and maintenance issues. The complexity of larger landscapes within which software may reside, can complicate performance measurement.

Also, software may experience a lengthy lifecycle, with updates to fix issues such as security vulnerabilities, and upgrades to add newly developed functionality. However the manual creation of tests, test data, and the assessment and analysis of the results, is often time-consuming, cumbersome, and expensive.

SUMMARY

Embodiments facilitate testing of software functions, by extrapolating upon a small volume test samples originally provided by a developer. Where the original test sample is determined to be numerical in nature, embodiments may perform repetition techniques to generate corpuses of test data of varying scope representing operation over different timescales. For original test samples exhibiting greater complexity (e.g., including text and/or hierarchical output states of the software function), embodiments select a relevant Machine Learning (ML) model and apply that ML model to generate the corpuses of test data. The expanded test data is then available for loading to measure one or more performance parameters (e.g., runtime, memory consumption; processing consumption; bandwidth) of the software function. Broadly reported non-linear behavior of performance parameter(s) may reveal lack of suitability of the generated data corpuses for testing. More specific non-linear behavior may helpfully reveal failure of the software function to pass certain tests.

The following detailed description and accompanying drawings provide a better understanding of the nature and advantages of various embodiments.

BRIEF DESCRIPTION OF THE DRAWINGS

FIG. 5 shows sample data provided by a developer.

Figures 6A, 6B:
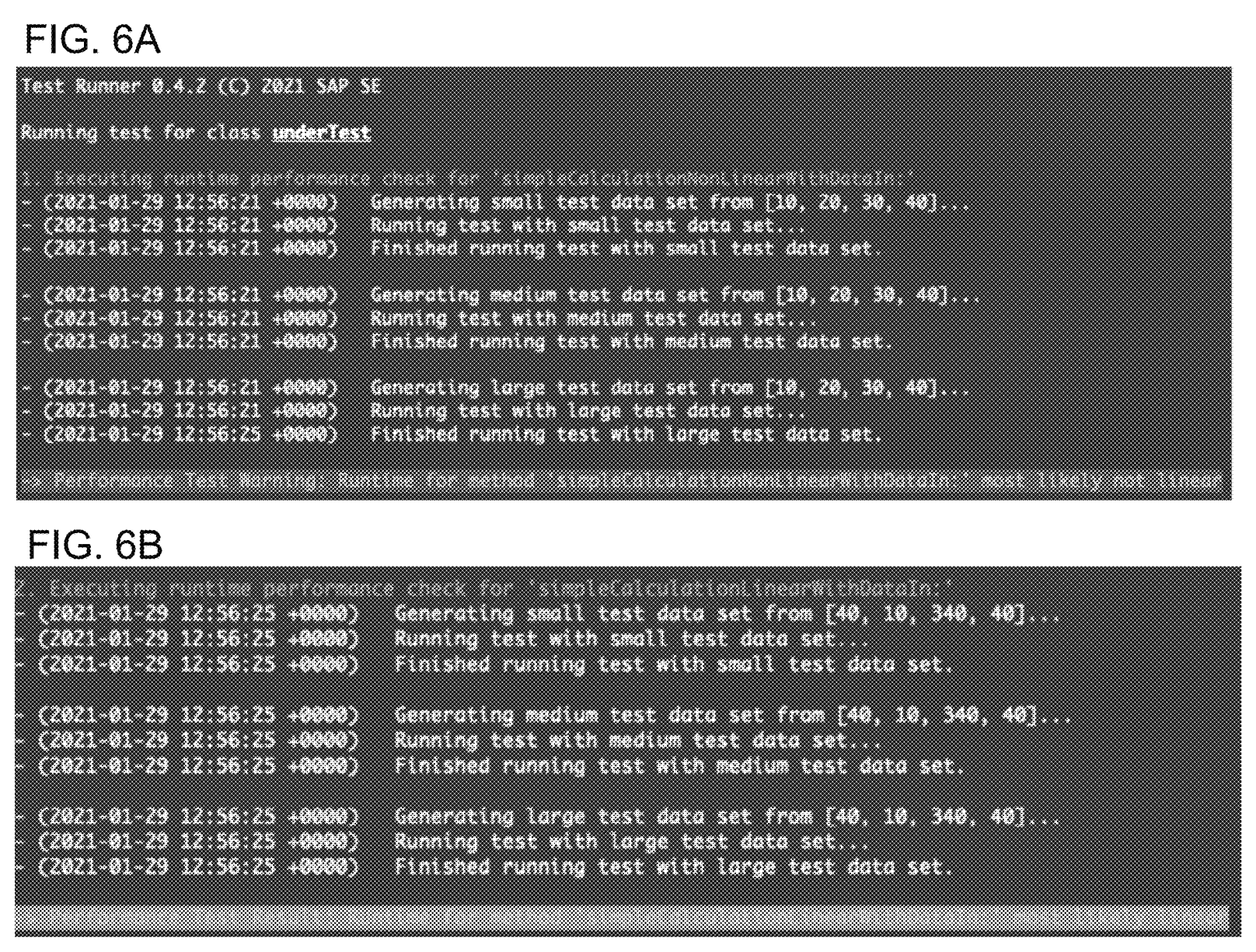

FIGS. 6A-6D show screenshots illustrating results of software testing.

DETAILED DESCRIPTION

Described herein are methods and apparatuses that implement software testing. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
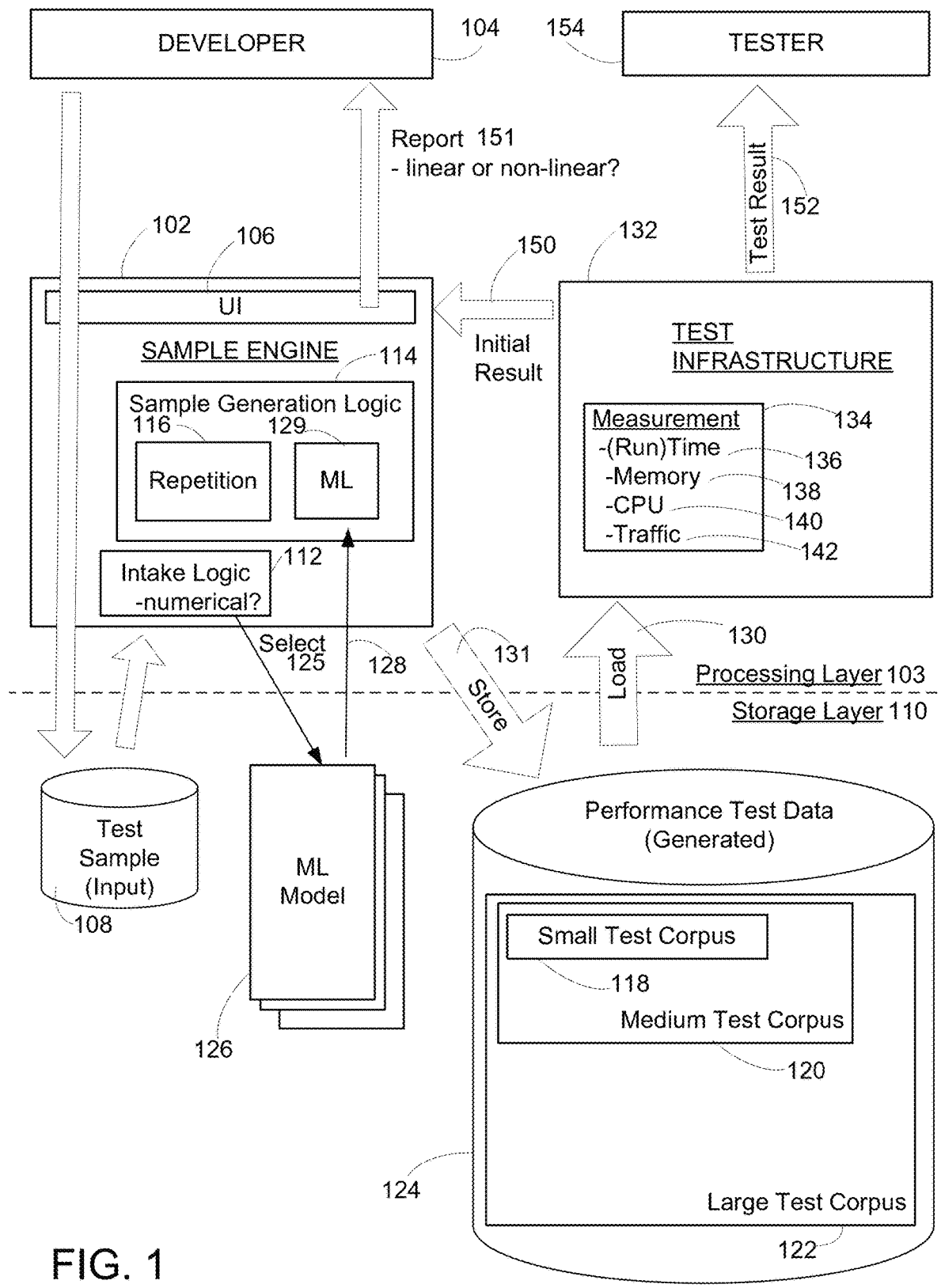
FIG. 1 shows a simplified diagram of a system according to an embodiment.

FIG. 1 shows a simplified view of an example system that is configured to implement software testing according to an embodiment. Specifically, system 100 comprises a sample engine 102 of a processing layer 103, in communication with a developer 104 via a user interface (UI) 106.

The developer is configured to input to the engine, an original sample 108 of results of operation of software (e.g., a particular software function). The data volume of this sample originally provided by the developer is relatively small, and does not reflect operation of the software/software function over a wide spectrum (short, medium, long) of timescales.

Accordingly, the sample engine serves to expand the simplified original sample, into elaborated samples suitable for use in testing the software/software function under a variety of operating conditions. In particular, the sample engine stores 109 the sample originally received from the developer, in an underlying storage layer 110.

Then, intake logic 112 of the sample engine determines whether the sample is primarily of numerical character (e.g., comprising sets of numbers). If so, sample generation logic 114 of the sample engine proceeds to generate corpuses of test data having different volumes, through a repetition technique 116.

For example, small volume test corpus 118, medium volume test corpus 120, and large volume test corpus 122 may be generated and then stored within a non-transitory computer readable storage medium 124. These generated corpuses of test data reflect operation of the software/software function over short, medium, and long timescales, respectively.

However, it is emphasized that the original test sample provided by the developer may represent software operational data that is significantly more complex than primarily numerical data. That is, in addition to numbers, the test sample may comprise strings and/or various output states of the software/software function.

Under these circumstances, the intake logic determines that the original test sample exhibits such a complex format. Then, the intake logic selects 125 a machine learning (ML) model 126 appropriate for generating the test corpuses having differing volumes.

Next, the sample generation logic applies 128 the relevant selected machine learning technique 129 to the test sample and to the selected model, generating the test data corpuses of different scope. That is, the result of application of the machine learning model may generate the training corpuses 118, 120, and 124 reflecting numerical data, texts, and complex hierarchical output states of the software when operated over different (short, medium, long) timescales, and store 131 those data corpuses in the storage layer.

Now, with the generated corpuses of test data of varying scope being available, these are loaded 130 to a testing infrastructure 132. That testing infrastructure may include mechanisms 134 for measuring performance parameters of the software/software function with the test training corpuses.

Examples of such performance parameters can include but are not limited to one or more of:
- software/software function runtime 136 (e.g., unit=seconds);
- consumption of memory 138 by the software/software function (e.g., unit=GB);
- consumption of available processing 140 resources by the software/software function (e.g., unit=%);
- communications bandwidth 142 available during software/software function operation (e.g., unit=MB/second);

As a check, an initial result 150 of this performance measurement is communicated back to the sample engine. Pervasive indication of non-linear behavior by the software/software function being tested, may reveal widespread test failures indicative of flaws in the testing corpus (rather than in the software itself). Under such circumstances, the check report 151 communicated to the developer may reveal a need to utilize a different sample generation logic (e.g., select a different ML model) or to refine ML model(s).

However, indication of predominantly linear software behavior by the initial results, may indicate that the data corpuses of varying scope are in fact suited for testing the software under different operating conditions. Then, the check report of localized non-linear behavior would in fact reveal failure of the software/software function being tested. Then, full performance test results 152 comprising the measured parameters could be communicated a tester 154 for evaluation.

Figure 2:
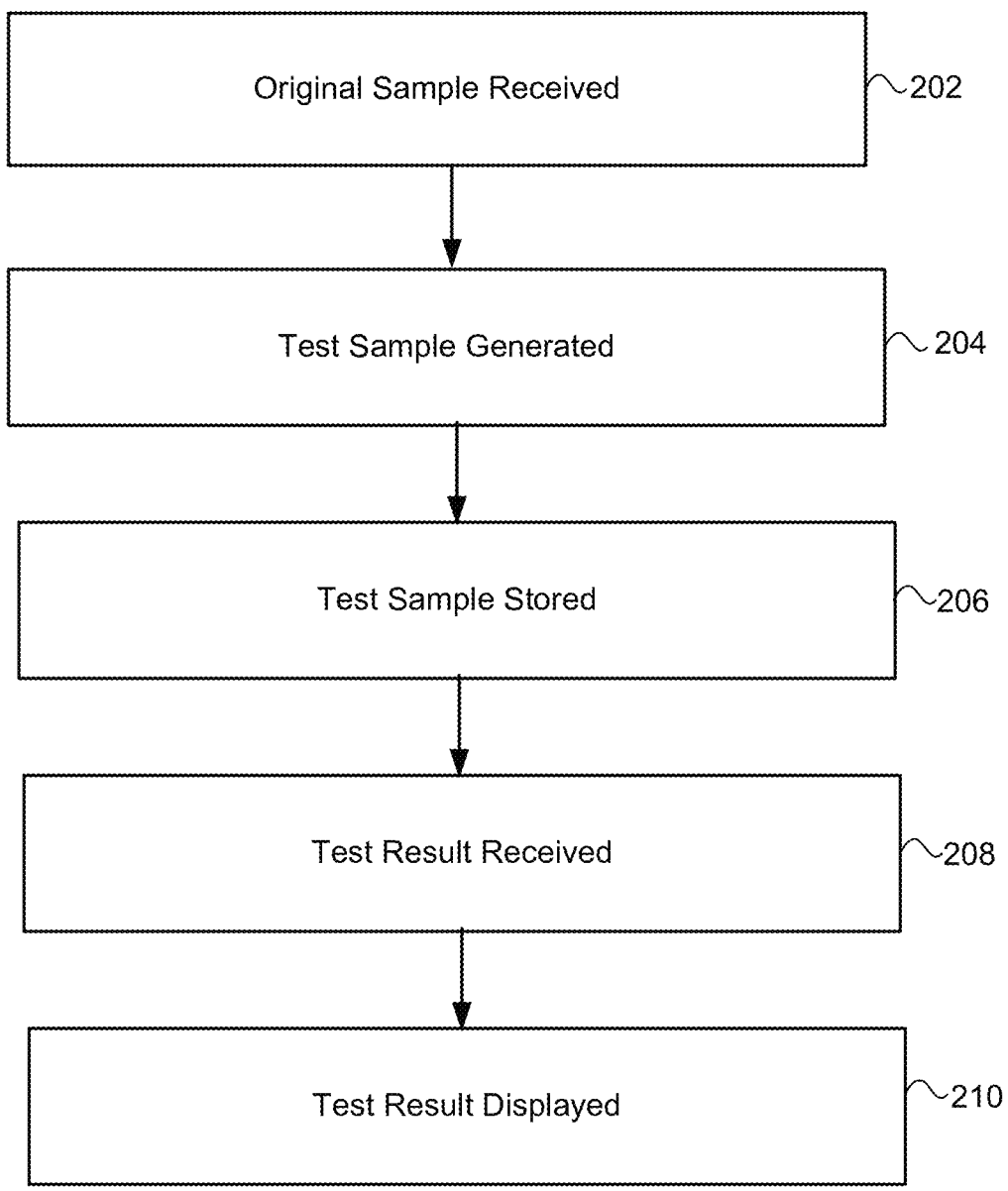
FIG. 2 shows a simplified flow diagram of a method according to an embodiment.

FIG. 2 is a flow diagram of a method 200 according to an embodiment. At 202, an original test sample is received representing operation of a software function.

At 204, a technique is applied to the original sample to generate a test sample having a second volume larger than the first volume, the test sample representing operation of the software function over a first timescale.

At 206, the test sample is stored in a non-transitory computer readable storage medium for loading to determine a performance parameter of the software function.

At 208 a test result of the performance parameter exhibiting non-linear behavior is received. At 210, a report indicating the test result is displayed.

Systems and methods according to embodiments, may provide one or more benefits. Particular, embodiments can reduce manual effort to furnish voluminous training sets for use in machine learning for software testing. Moreover, embodiments may integrate with existing software testing frameworks, reducing complexity and cost.

Further details regarding software testing according to various embodiments, are now provided in connection with the following example.

Example

Figure 3:
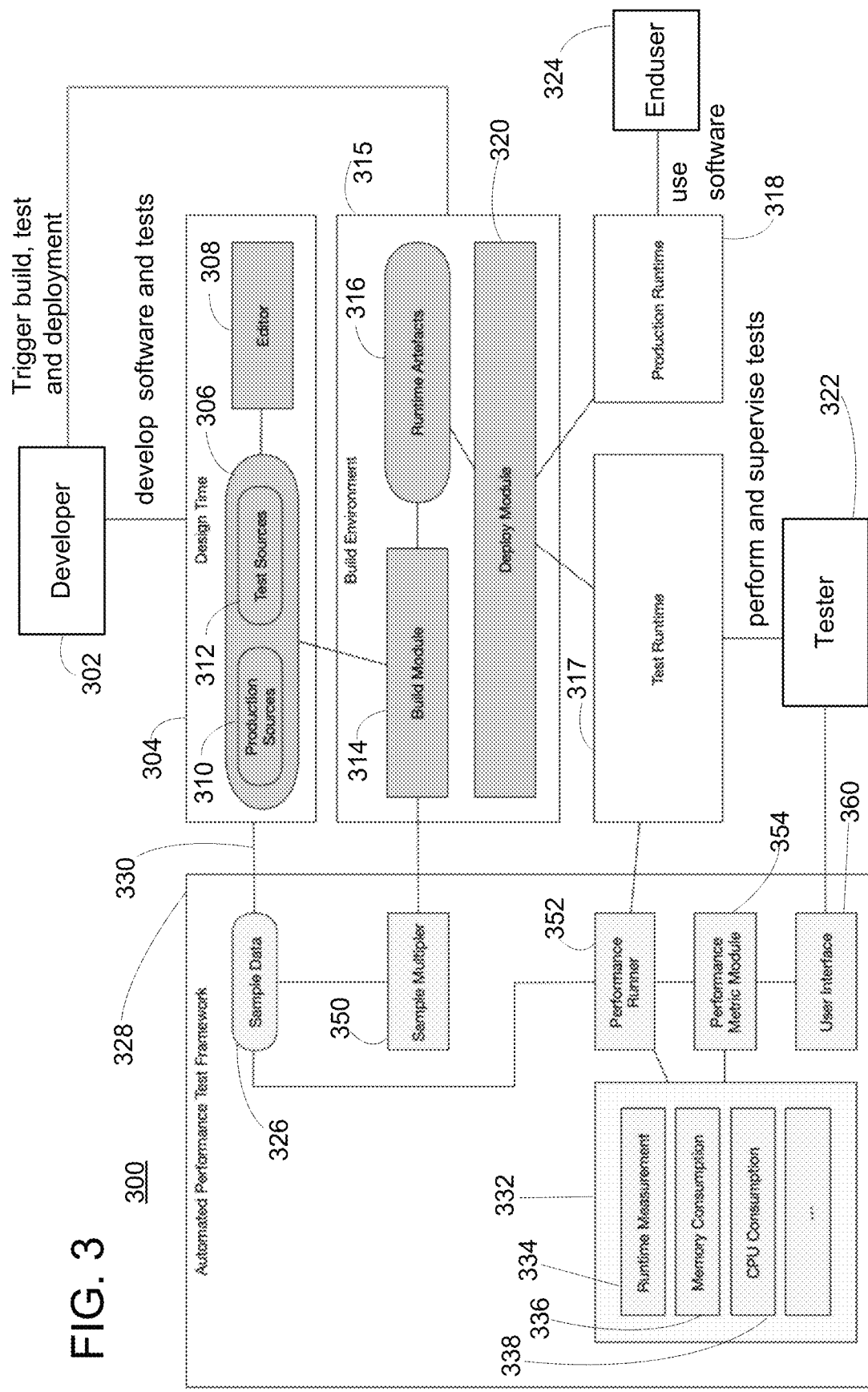
FIG. 3 shows a simplified block diagram of an embodiment of one system according to an exemplary embodiment.

In a general context, software development processes may include development, testing, and productive usage. FIG. 3 shows a simplified block diagram illustrating a system 300 that is configured to perform testing of software according to an embodiment.

The developer 302 uses a design time environment 304 to create, modify and delete software artifacts 306 in an editor 308. This includes sources for productive operation 310 and sources for test usage 312.

Once finished, a build process is triggered in build environment 315. A build module 314 transforms the design time sources 306 into runtime artifacts 316.

Once triggered by the developer, those artifacts can be deployed to either a test runtime 317 or to the productive runtime 318 using a deploy module 320. The test phase may be finished successfully before the production runtime deployment is implemented.

In turn, testers 322 can perform testing and quality tasks within the test. End users 324 are able to use the software productively during testing.

Manual effort may be called for on the developer side, when considering wider testing in general and performance testing. In particular, a developer may be responsible for generating the coding and performance test data 310 and 312 respectively.

Often, however, software performance is evaluated based upon a large quantities of data provided to the production coding for execution. Hence, this voluminous data is to be described and created.

Also, to understand the behavior with respect to size (e.g., small amount=short runtime; medium amount=med runtime; large amount=long runtime) different test data sets may be built, coded, and integrated. After building and deploying, this test data can be used in the test runtime to test a specific piece of software/software function.

Accordingly, as described herein, embodiments lessen the burden of manual activity on the developer to create large volumes of testing data. In particular, the developer need only provide relatively small samples 326 to automated performance test framework 328, with the sizeable data volumes 310, 312 called for by testing then being automatically generated therefrom.

That generated test data serves as input 330. The execution of the actual software processing block is then triggered and output results can be observed.

Runtime parameters 332 are observed and measured. Such parameters may include but are not limited to:
- runtime 334,
- memory consumption 336,
- CPU consumption 338,
- network traffic, and
- others.

The measured results are then evaluated and assessed. Based on pre-defined metrics and discretion of the developer/tester, those test results can be accepted or not. Non-acceptance of results implies that improvements may be needed.

In order to streamline the testing process and reduce manual effort and lower cost, embodiments may implement automated measurement of performance over a software's entire lifecycle. Particular embodiments automate the generation of test data and the respective interpretation of the results based on the generated data. This enhances software development processes with a performance test framework for test data creation and evaluation.

Figure 4:
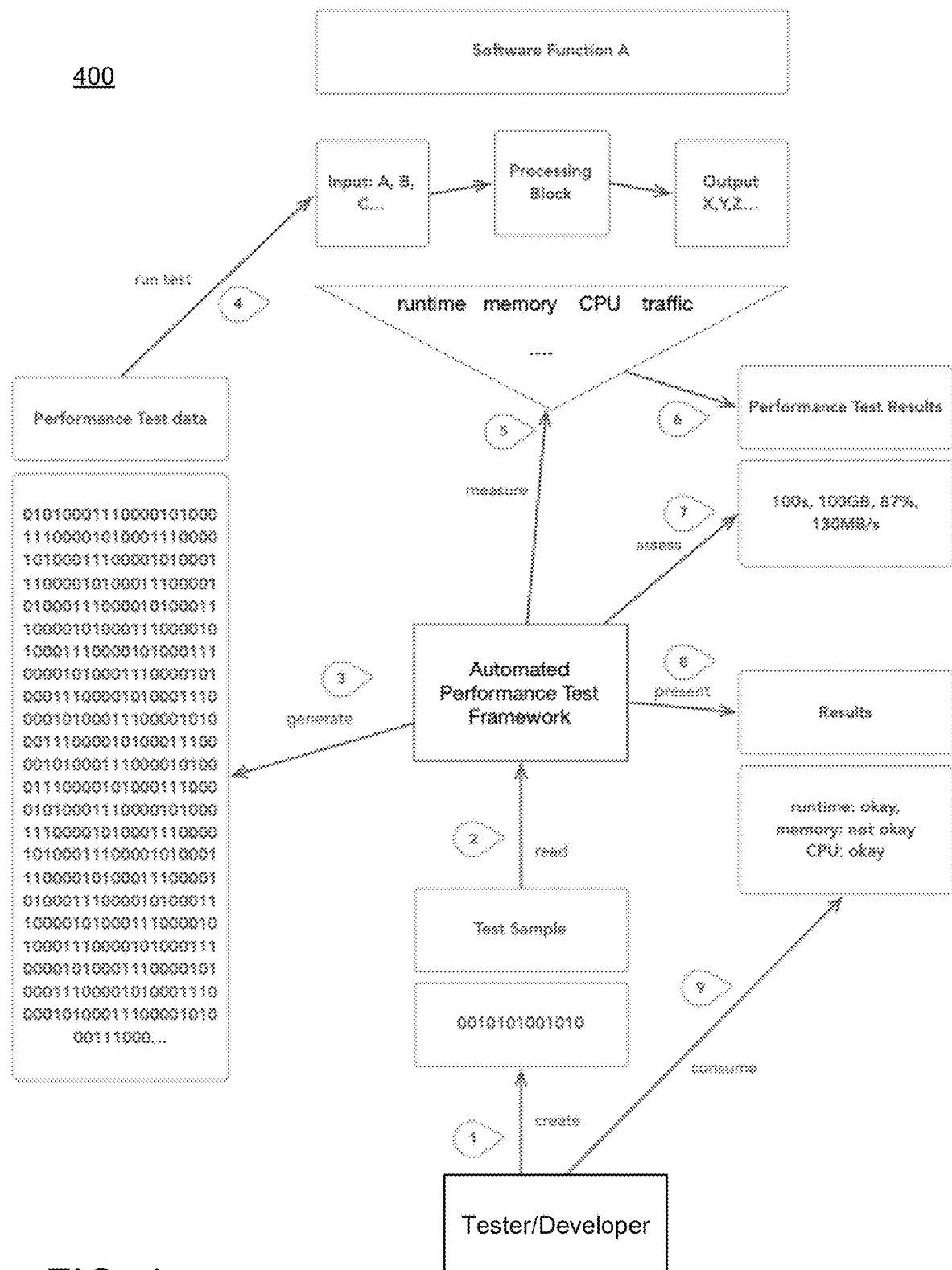
FIG. 4 is a simplified diagram showing a flow of actions occurring according to the exemplary embodiment.
Figure 6C:
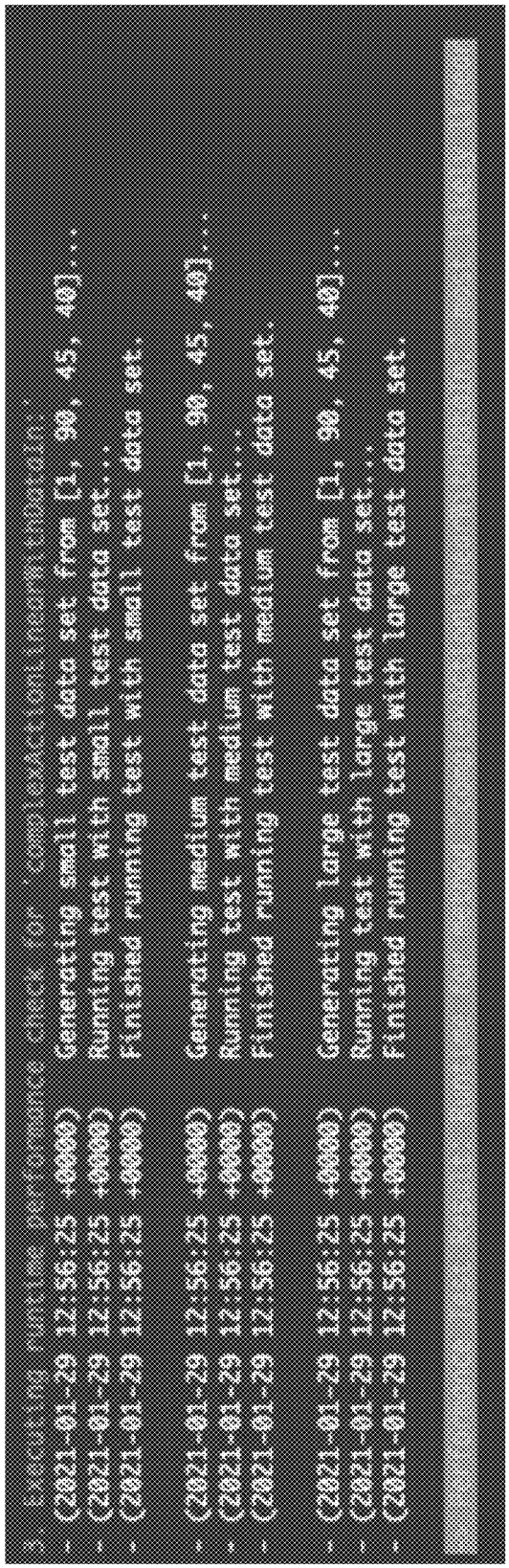
Figure 6D:
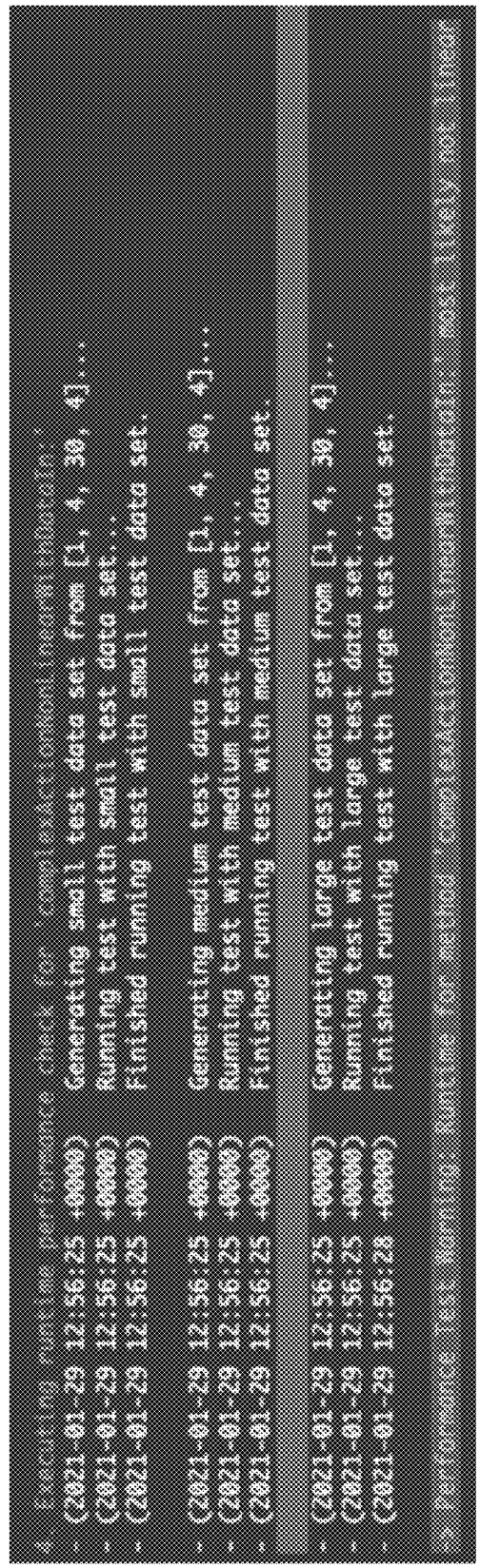

As shown in the simplified flow diagram 400 of FIG. 4, the developer interacts with the design time. However, rather than being tasked with manually creating voluminous, comprehensive performance data test sets, at (1) only a small set of samples is created and stored in the respective sample data component.

Based on that sample data, at (2) a sample multiplier module 350 generates a voluminous mass of data for performance tests (3). This generation can include different sizes of test sets (e.g. small; medium; large) to provide both absolute performance metrics and relative performance metrics. Those metrics can reveal non-linear runtime behavior, thereby aiding developers to improve testing procedures.

It is noted that the sample multiplier itself can provide various strategies to generate the mass data. Examples of such strategies can include but are not limited to:

repetition of sample input, or use of a Machine Learning (ML) based model.

In particular, the ML based option may offer a valuable approach to generating mass data for testing from small sample sets. Pre-trained ML models can be provided with common data patterns. Those models take the simple sample data as input and provide fitting mass data as output.

Triggered by a tester or developer, the test execution (4) is controlled by the performance runner component 352. Accordingly, performance metric module 354 will record and measure the relevant data point (5) based on different modules providing processing for different types of data.

The results may be processed (6) and assessed (7) automatically with respect to the assigned data module. That is parameters such as runtime measurement, memory consumption, CPU consumption, and/or traffic can be determined. For the simplified example shown in FIG. 4, the following specific runtime parameters for Software Function A were determined:

runtime=100 seconds memory consumption=100 GB

CPU consumption=87% traffic=130 MB/sec

The respective results are then presented (8) in the user interface 360. Those results are thus readily available to the tester and/or developer (9). In FIG. 4, the performance assessment available at the UI indicates the memory consumption test results as being unacceptable.

In an example, a developer may be creating a feature implementing the following four distinct methods:

'simpleCalculationNonLinearWithDataIn'

'simpleCalculationLinearWithDataIn'

'complexActionNonLinearWithDataIn'

'complexActionLinearWithDataIn'.

The developer need only provide small sample data sets. FIG. 5 shows an example of sample data provided by the developer.

Here, for the method:

'simpleCalculationNonLinearWithDataIn' the original simple data set is [10, 20, 30, 40]. Hence relatively little additional manual effort is called for from a development perspective.

The performance runner 352 then utilizes those original, simple samples in order to generate differently sized (e.g., small; medium; large) test data sets, execute each method, measure runtime, provide feedback, and access the results.

FIGS. 6A-D are screenshots showing an example performance test run, including data multiplexing, test execution and result evaluation. Here, two test executions (FIGS. 6A and 6D) indicate non-linear runtime. By contrast, the FIGS. 6B-C indicate acceptable linear runtimes.

It is noted that in the particular embodiment of FIG. 3, the performance measurement functions are located within the performance test framework. However certain embodiments may be configured to provide generated test data to an existing testing platform that already includes functionality for runtime measurement, memory consumption, and CPU consumption.

Returning now to FIG. 1, there the particular embodiment is depicted with the engine responsible for software testing as being located outside of the database containing the machine learning models. However, this is not required.

Figure 7:
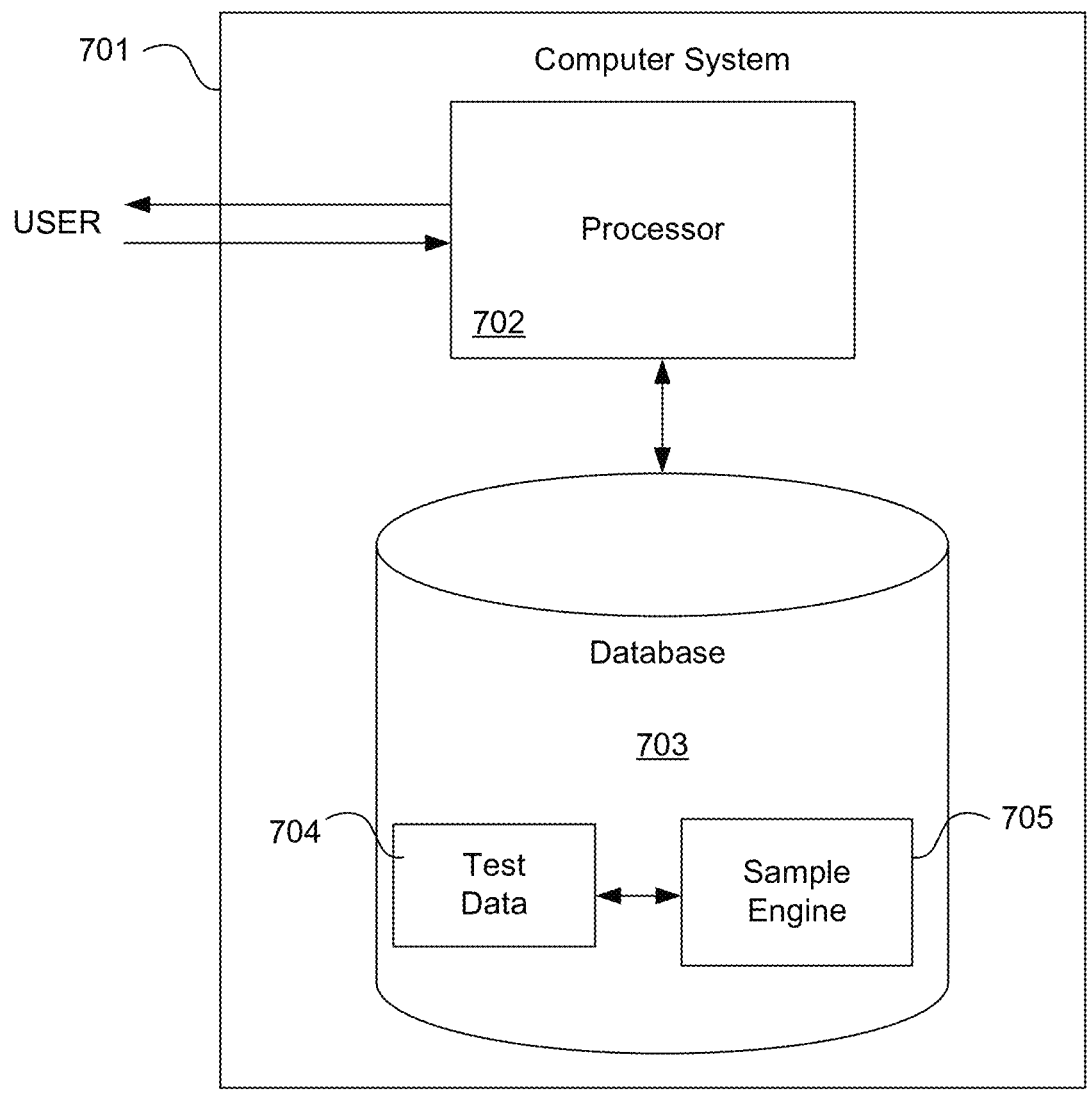
FIG. 7 illustrates hardware of a special purpose computing machine configured to implement software testing according to an embodiment.

Rather, alternative embodiments could leverage the processing power of an in-memory database engine (e.g., the in-memory database engine of the HANA in-memory database available from SAP SE), in order to perform various functions. Such functions can include but are not limited to one or more of:

storing original data samples;

storing ML model(s);

applying (repetition; ML) techniques to generate corpuses of test data of varying scope;

storing test data corpuses;

measuring performance parameters;

identifying (non)linear behavior characteristics of performance parameters;

Thus FIG. 7 illustrates hardware of a special purpose computing machine configured to implement software testing according to an embodiment. In particular, computer system 701 comprises a processor 702 that is in electronic communication with a non-transitory computer-readable storage medium comprising a database 703. This computer-readable storage medium has stored thereon code 705 corresponding to a sample engine. Code 704 corresponds to test data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:

receiving first test sample data having a first volume, the first test sample data representing operation of a software function;

applying a technique to the first test sample to generate a second test sample having a second volume larger than the first volume, the second test sample representing operation of the software function over a first timescale;

storing the second test sample in a non-transitory computer readable storage medium for loading to measure a performance parameter of the software function;

receiving a non-linear result of the performance parameter; and displaying a report indicating the non-linear result.

Example 2. The computer implemented system and method of Example 1 further comprising:

determining the first test sample data to be exclusively numerical, wherein applying the technique comprises applying a repetition technique.

Example 3. The computer implemented system and method of Example 1 further comprising:

determining the first test sample data to not be exclusively numerical; and selecting a machine learning model based upon the first test sample data, wherein applying the technique comprises applying the machine learning model to the first test sample data.

Example 4. The computer implemented system and method of Example 1 wherein: the non-transitory computer readable storage medium comprises an in-memory database;

and the technique is applied by an in-memory database engine of the in-memory database.

Example 5. The computer implemented system and method of Example 4 wherein the machine learning model is stored in the in-memory database.

Example 6. The computer implemented system and method of Examples 4 or 5 wherein the in-memory database engine measures the performance parameter.

Example 7. The computer implemented system and method of Examples 4, 5, or 6 wherein the in-memory database engine determines the first test sample data to not be exclusively numerical.

Example 8. The computer implemented system and method of Examples 1, 2, 3, 4, 5, 6, or 7 wherein the performance parameter reflects:
time to execute the software function;
memory consumed by the software function;
processing capacity consumed by the software function; or
bandwidth consumed by the software function.

Example 9. The computer implemented system and method of Examples 1, 2, 3, 4, 5, 6, 7, or 8 further comprising:
applying the technique to the first test sample to generate a third test sample having a third volume larger than the second volume; and
storing the third test sample in the non-transitory computer readable storage medium for loading to determine the performance parameter,
wherein the third test sample corresponds to operating the software function over a second timescale longer than the first timescale.

Figure 8:
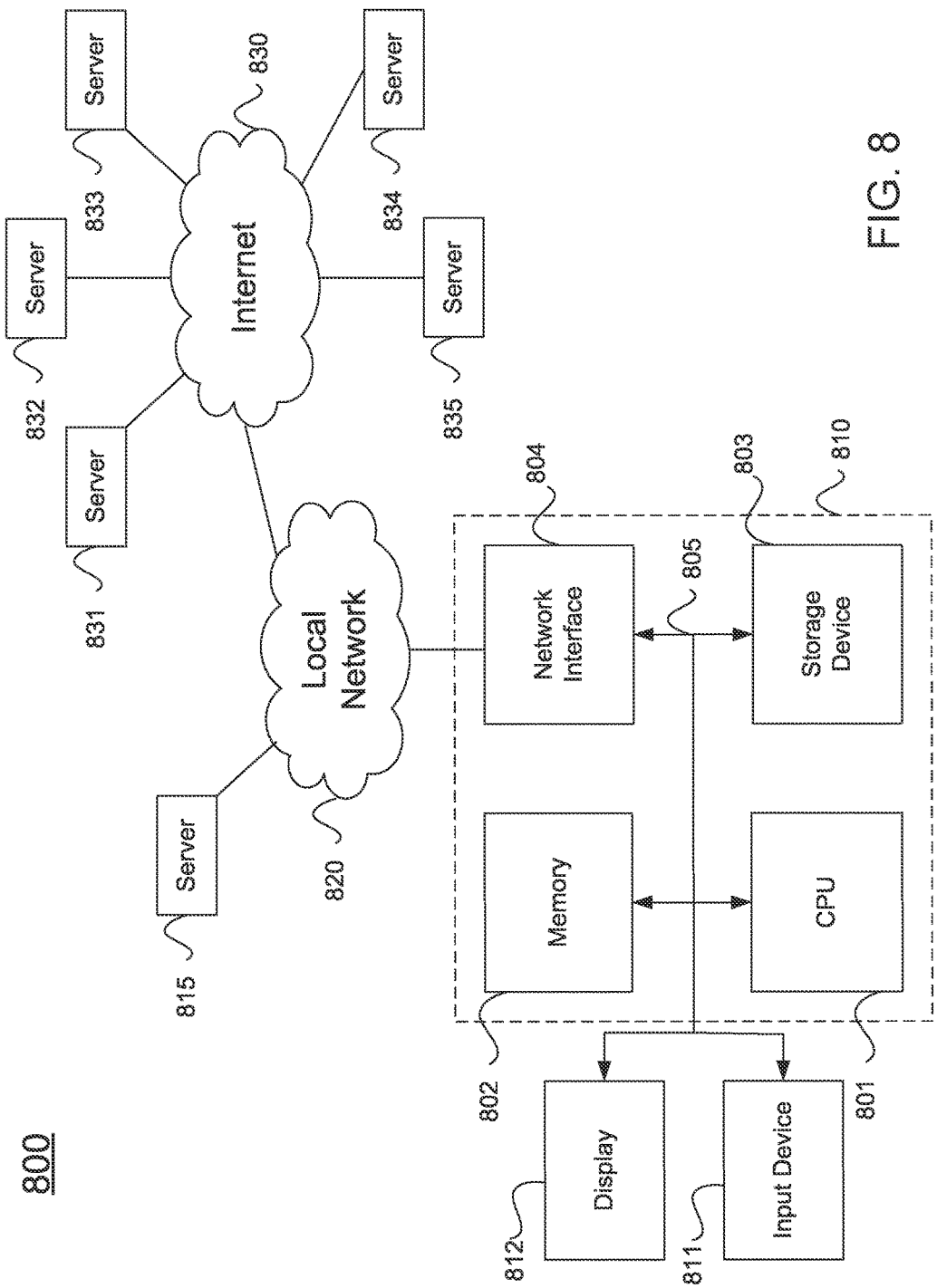
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable media.

Computer system 810 may be coupled via bus 805 to a display 812, such as a Light Emitting Diode (LED) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method implementing software performance testing comprising:
receiving first test sample data having a first volume, the first test sample data representing operation of a software function;
determining a format of the first test sample data to be not numerical;
in response to determining that the format of the first test sample data is not numerical, applying the first test sample data to a first pre-trained machine learning model to produce a plurality of different sized data corpuses, each of the data corpuses being larger than the first volume and representing operation of the software function over a plurality of timescales;
testing the software using the plurality of different sized data corpuses and producing a plurality of results corresponding to the plurality of timescales; and
applying the first test sample data to a second pre-trained machine learning model, different from the first pre-trained machine learning model, and repeating said testing step in response to determining the plurality of results is non-linear.

2. A method as in claim 1 wherein:
a non-transitory computer readable storage medium comprises an in-memory database; and
the method is applied by an in-memory database engine of the in-memory database.

3. A method as in claim 2 wherein the first pre-trained machine learning model and the second pre-trained machine learning model are stored in the in-memory database.

4. A method as in claim 2 wherein the in-memory database engine measures a performance parameter.

5. A method as in claim 2 wherein the in-memory database engine determines the first test sample data to be not numerical.

6. A method as in claim 1 wherein a performance parameter reflects:
time to execute the software function;
memory consumed by the software function;
processing capacity consumed by the software function; or
bandwidth consumed by the software function.

7. A method as in claim 1 further comprising:
storing the plurality of different sized data corpuses in a non-transitory computer readable storage medium.

8. A method as in claim 1 wherein a report indicating the non-linear result includes an initial result of a performance parameter.

9. A non-transitory computer readable storage medium embodying a computer program for performing a method implementing software performance testing, the method comprising:
receiving first test sample data having a first volume, the first test sample data representing operation of a software function;
determining a format of the first test sample data to be not numerical;
in response to determining that the format of the first test sample data is not numerical, applying the first sample data to a first pre-trained machine learning model to produce a plurality of different sized data corpuses, each of the data corpuses being larger than the first volume and representing operation of the software function over a plurality of timescales;
testing the software using the plurality of different sized data corpuses and producing a plurality of results corresponding to the plurality of timescales; and
applying the first test sample data to a second pre-trained machine learning model, different from the first pre-trained machine learning model, and repeating said testing step in response to determining the plurality of results is non-linear.

10. A non-transitory computer readable storage medium as in claim 9 wherein a performance parameter reflects:
time to execute the software function;
memory consumed by the software function;
processing capacity consumed by the software function; or
bandwidth consumed by the software function.

11. A non-transitory computer readable storage medium as in claim 9 wherein the method further comprises:
storing the plurality of different sized data corpuses in a database.

12. A non-transitory computer readable storage medium as in claim 9 wherein a report indicating the non-linear result includes an initial result of a performance parameter.

13. A computer system implementing software performance testing comprising:
one or more processors;
a software program, executable on the computer system, the software program configured to cause an in-memory database engine of an in-memory database to:
receive first test sample data having a first volume, the first test sample data representing operation of a software function;
determine a format of the first test sample data to be not numerical;
in response to determining the format of the first sample data is not numerical, apply the first test sample data to a first pre-trained machine learning model to produce a plurality of different sized data corpuses, each of the data corpuses being larger than the first volume and representing operation of the software function over a plurality of timescales;
test the software using the plurality of different sized data corpuses and produce a plurality of results corresponding to the plurality of timescales; and
apply the first test sample data to a second pre-trained machine learning model different from the first pre-trained machine learning model and repeat said test step in response to determining the plurality of results is non-linear.

14. A computer system as in claim 13 wherein the first pre-trained machine learning model and the second pre-trained machine learning model are stored in the in-memory database.

15. A computer system as in claim 13 wherein a performance parameter reflects:
time to execute the software function;
memory consumed by the software function;
processing capacity consumed by the software function; or
bandwidth consumed by the software function.

16. A computer system as in claim 13 wherein the in-memory database engine is further configured to determine the non-linear result.

17. A computer system as in claim 13 wherein the in-memory database engine is further configured to measure a performance parameter.

18. A computer system as in claim 13 wherein a report indicating the non-linear result includes an initial result of a performance parameter.

* * * * *